United States Patent [19]

Becker et al.

[11] 4,118,325

[45] Oct. 3, 1978

[54] FIREPROOFING COMPOSITION

[75] Inventors: Donald E. Becker; Gary D. Achenbach, both of Ponca City; George W. Stuever, Kildare, all of Okla.

[73] Assignee: Continental Oil Company, Ponca City, Okla.

[21] Appl. No.: 754,793

[22] Filed: Dec. 27, 1976

[51] Int. Cl.$^2$ .............................................. C09K 3/28
[52] U.S. Cl. ...................................... 252/8.1; 106/75; 106/84
[58] Field of Search ...................... 106/75, 84; 252/8.1

[56] References Cited

U.S. PATENT DOCUMENTS

| 3,827,869 | 8/1974 | von Bonin | 106/75 |
| 3,933,514 | 1/1976 | Banks et al. | 106/75 |
| 3,961,972 | 6/1976 | Sparlin et al. | 106/75 |
| 3,969,567 | 7/1976 | Occleshaw et al. | 252/8.1 |

Primary Examiner—Benjamin R. Padgett
Assistant Examiner—Christine M. Nucker
Attorney, Agent, or Firm—Richard W. Collins

[57] ABSTRACT

A fireproofing composition comprised of a low density matrix material, such as rigid foamed sodium silicate, having an expandable hydrated mineral material such as unexpanded vermiculite or unexpanded perlite incorporated therein.

4 Claims, No Drawings

FIREPROOFING COMPOSITION

FIELD OF THE INVENTION

This invention relates to fireproofing compositions, and more particularly to fireproofing compositions of the type for use on structural steel, construction panels and the like. In recent years, a need has developed for fireproofing of existing structures such as columns, tanks and piping in petroleum refinery units. These uses present a need for a fireproofing material which can be sprayed on and which is effective in a relatively thin coating.

The characteristics of a desirable fireproofing composition include the ability to hold a coated substrate below about 540° C. for 1 hour or more in continuous heat exposure of 1000° C. or more at the surface of the insulation, the ability to provide insulating properties over an extended period of time under atmospheric weathering conditions, the ability to be applied with a conventional spray gun, and the ability to withstand reasonable mechanical stress. In many cases, lightness in weight, water vapor resistance, flexibility and non-corrosiveness are also desirable properties. These characteristics are not easily provided in a single composition, and in many cases compromises have been made in one or more of the above properties in order to obtain a specified level of one or more of the other properties. In any event, there has been a continuing need for improved fireproofing compositions which provide the above noted properties to the maximum extent.

THE PRIOR ART

A broad range of materials has been utilized in the past as fireproofing compositions. High density materials such as concrete and gunite have been used successfully for many years in industry. These high density materials provide many desirable fireproofing properties, but they are subject to the disadvantages of being heavy, expensive, and difficult to install in certain applications. Plaster provides some advantages, but unless it can be sprayed on it is a high installation-cost material, and is not particularly durable. Sprayed plaster is low cost and lightweight, but is subject to dusting and flaking, and is otherwise easily damaged. Sprayed mineral fibers are lightweight and low cost, but are not suited for use in protecting structural steel members and the like. The Carboline Corporation of St. Louis, Missouri provides a low cost, light weight, sprayable insulation material which includes a hydrated magnesium chloride compound and is marketed under the name Pyrocrete. The Pyrocrete type materials have been used successfully in many commercial applications.

A high strength, water resistant rigid alkali metal silicate foam composition is described in U.S. Pat. No. 3,933,541. That material also has many of the desirable properties of an ideal fireproofing composition. It is light in weight, sprayable, water resistant and inexpensive. Nevertheless, there has been a continuing need for even more effective fireproofing compositions, and such compositions are provided by this invention.

SUMMARY OF THE INVENTION

According to the present invention, a low density fireproofing composition is provided which can be applied with conventional spraying equipment and which is durable, lightweight, inexpensive, non-friable and effective as a fireproofing material. In a preferred form, the composition includes a sodium silicate foam matrix having a particulate, expandable hydrated mineral material incorporated therein. Preferred mineral materials are unexpanded vermiculite and unexpanded perlite. It has been found that compositions in accordance with the invention provide increased fire protection over similar prior art compositions utilizing expanded vermiculite or perlite.

DESCRIPTION OF THE PREFERRED EMBODIMENT

In selection of a fireproofing composition, a choice must generally be made in which fire protection is weighed against other considerations which might affect the suitability of a specific composition for a particular use. The characteristics of heavy fireproofing compositions such as concrete and gunite are well known, but the characteristics of lightweight fireproofing materials are not so well known, and include the ability to provide protection through one or more of the following chemical reactions which take place upon exposure of the compositions to heat from a fire. Calcination of the composition results in a breakdown of the stable materials, generally resulting in absorption of heat which is then unavailable to affect the protected substrate. Ablation is a process of peeling off exhausted surface layers of insulation to expose new protective layers. Intumescence occurs when heat converts a thin coating of a fireproofing material into a thick insulating barrier. During intumescence, cooling gases are normally released, leaving a reflective multi-cellular foam insulation. Thermal hydrogeneration occurs during some calcination reactions when the heat causes release of water of hydration as water vapor. Gypsum plasters and some cementitious materials utilize this reaction for fireproofing, as does the composition of this invention.

Compositions in accordance with this invention include a low density matrix, preferably a rigid alkali metal silicate foam having incorporated therein an effective amount of a particulate hydrated mineral material capable, upon exposure to heat, of expanding by a factor of five or more and of liberating water of hydration. The low density matrix portion of the composition is not limited to alkali metal silicate foams, but can include any lightweight sprayable fire-resistant material capable of coating a substrate and of incorporating therein particulate expandable mineral material as required by the invention. There is no absolute limitation as to the density of the composition, but a density of not more than 1.0 grams per cubic centimeter is preferred, and a density of not more than 0.6 grams per cubic centimeter is most preferred.

The expandable mineral material required in the composition of this invention can be any mineral capable of expanding to from five to twenty times its unexpanded volume upon exposure to heat. The most preferred mineral material is unexpanded vermiculite, as unexpanded vermiculite expands to from 6 to 20 times its unexpanded volume upon exposure to heat, and also contains a significant amount of water of hydration which is released upon exposure to heat to provide an insulating gaseous barrier. The amount of mineral material to be used should be from 5 to 35 weight percent on a dry weight basis of the composition, and preferably about 10 to 20 weight percent of the particulate mineral material is utilized. The particulate material may range in size from as large as about 6 mesh to as small as 200 mesh. Larger particles lead to plugging of spray equipment and are difficult to disperse uniformly, and particles smaller than about 200 mesh are generally difficult to handle. Preferably, the bulk of the particles are sized to pass through a 6 mesh screen and to be retained on a 25 mesh screen.

The low density matrix portion of the composition of this invention is preferably an alkali metal silicate foam such as is described in U.S. Pat. No. 3,933,514. Other suitable silicate foam compositions are described in U.S. Pat. Nos. 3,661,602 and 3,741,898. The silicate foam compositions described in U.S. Pat. No. 3,933,514 include a water-soluble alkali metal silicate, a cementing agent such as sodium silicofluoride, a gelling agent such as a low molecular weight amide or a haloalcohol, a fibrous filler such as chopped glass fiber particles, and particulate filler such as vermiculite or perlite. The compositions described in that patent differ from the compositions of this invention in that the compositions of the invention require an unexpanded particulate mineral material whereas the compositions of the patent utilize an expanded vermiculite or perlite material. Expanded vermiculte and perlite have been widely utilized in insulating compositions for many years, and are generally effective for their intended purpose. However, the use of unexpanded particulate material provides improved properties compared to the use of expanded material in fireproofing compositions, and it is this feature upon which this invention is based.

A particularly preferred aqueous formulation which is readily applied by conventional spraying equipment and which, after spraying and drying, provides a rigid foam coating includes, on a parts by weight per 100 parts of aqueous composition basis, about 60 to 80 parts of aqueous sodium silicate (38 weight percent sodium silicate in water), about 1 to 3 parts of chopped glass fibers, about 8 to 16 parts sodium silicofluoride, about 3 to 25 parts unexpanded vermiculite, about 0.5 to 1.5 parts formamide and about 0.2 to 2.0 parts foaming agent.

EXAMPLE 1

A composition containing unexpanded vermiculite in accordance with the invention was formulated and compared to an otherwise identical composition containing expanded vermiculite. Both compositions included 415 grams aqueous sodium silicate solution, 10 grams chopped glass fibers, 70 grams sodium silicofluoride, 5 grams formamide and 45 grams vermiculite. The only difference in the compositions was the use of expanded vermiculite having a bulk density of about 0.1 grams per cubic centimeter in the prior art composition and unexpanded vermiculite having a bulk density of about 0.9 grams per cubic centimeter in the composition according to the invention. A urethane substrate was coated to a thickness of 1.27 centimeters with each composition. The coated substrates were aged, and then placed approximately 10 centimeters above an open flame (810°-835° C.) in a horizontal position for 15 minutes. After the fire test, the fireproofing coating was removed, and the average thickness of the coating was measured along with the volume of substrate destroyed.

The composition using unexpanded vermiculite gave results about 20 percent better than the composition using expanded vermiculite.

EXAMPLE 2

A preferred composition of the invention, designated SSF 3222-94 and consisting of 415 grams aqueous sodium silicate, 10 grams chopped glass fibers, 70 grams sodium silicofluoride, 90 grams unexpanded vermiculite, 5 grams formamide, and 3 grams foaming agent was formulated and tested against the commercially-available fireproofing materials available from Carboline Corporation as high density Pyrocrete and low density Pyrocrete. The results of this test are shown in Table I, and show that the composition in accordance with this invention is only slightly less effective than the Pyrocrete materials, and the composition according to the invention is significantly less expensive such that additional thickness of the composition of the invention can be utilized and still a cost advantage can be obtained to get the equivalent protection.

TABLE I

| Material | Coating Thickness (cm) | Volume of Urethane Destroyed (cc) |
| --- | --- | --- |
| Pyrocrete - High Density | 0.953 | 560 |
| Pyrocrete - Low Density | 1.113 | 625 |
| Pyrocrete - Low Density | 0.795 | 820 |
| Pyrocrete - High Density | 1.430 | 150 |
| Pyrocrete - Low Density | 1.270 | 325 |
| Pyrocrete - Low Density | 0.795 | 800 |
| SSF 3222-94 | 0.953 | 660 |
| SSF 3222-94 | 0.635 | 1230 |
| SSF 3222-94 | 1.588 | 330 |
| SSF 3222-94 | 1.430 | 625 |

The exact nature of the reaction provided by the composition of the invention is not known with certainty, but it is believed that the combination of heat absorption during expansion of the unexpanded mineral and the creation of a water vapor film from the liberated water of hydration combines to provide the improved protection. The silicate foam itself also provides significant protection, and the combination of silicate foam, heat absorption and water vapor film provides the high degree of protection as exemplified by the foregoing examples.

Just as the use of unexpanded vermiculite provides improved protection compared to a similar composition utilizing expanded vermiculite, as demonstrated in Example 1, the use of unexpanded vermiculite or perlite in other types of compositions having a low density matrix, such as compositions utilizing hydrated magnesium chloride, would also be expected to provide improved results when unexpanded mineral material containing water of hydration is utilized.

The foregoing detailed description of the preferred embodiments of the invention is intended to be exemplary, rather than limiting, and it will be apparent that numerous variations and modifications could be made within the true scope of the invention.

What is claimed is:

1. A fireproofing composition comprising a low density foamed alkali metal silicate matrix having incorporated therein, on a dry weight basis, from 5 to 35 weight percent of an unexpanded particulate mineral material selected from the group consisting of unexpanded vermiculite and unexpanded perlite, said material having a particle size range of from 6 to 200 mesh and being capable of expanding to from 5 to 20 times its unexpanded volume upon exposure to heat.

2. A fireproofing composition comprising a low density foamed alkali metal silicate matrix having incorporated therein, on a dry weight basis, from 5 to 35 weight percent of unexpanded vermiculite having a particle size range of from 6 to 200 mesh.

3. The composition of claim 2 wherein said low density matrix comprises foamed sodium silicate.

4. A composition comprising, in parts by weight per 100 parts of said composition, the following:

| Ingredients | Parts by Weight |
|---|---|
| Aqueous sodium silicate (38 weight percent sodium silicate in water) | 60-80 |
| Glass fibers | 1-3 |
| Sodium silicofluoride | 8-16 |
| Unexpanded vermiculte | 3-25 |
| Formamide | 0.5-1.5 |
| Foaming agent | 0.2-2.0 |

* * * * *